United States Patent [19]

Rappaport et al.

[11] Patent Number: 6,002,423
[45] Date of Patent: *Dec. 14, 1999

[54] THREE-DIMENSIONAL IMAGING SYSTEM

[75] Inventors: Saul Rappaport, Burlington; Geert Wyntjes, Chelsea; Orr Shepherd, Arlington, all of Mass.

[73] Assignee: Visidyne, Inc., Burlington, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/586,546

[22] Filed: Jan. 16, 1996

[51] Int. Cl.⁶ .................................................. H04N 7/08
[52] U.S. Cl. ............................ 348/42; 348/43; 348/45; 348/46; 348/162; 348/164
[58] Field of Search .................. 348/31, 42, 43, 348/44, 45, 162, 163, 164

[56] References Cited

U.S. PATENT DOCUMENTS

| | | | |
|---|---|---|---|
| 4,528,669 | 7/1985 | Bostick et al. | 348/31 |
| 4,935,616 | 6/1990 | Scott | 250/213 |
| 5,161,125 | 11/1992 | Maccabee | 348/31 |
| 5,216,477 | 6/1993 | Korb | 348/31 |
| 5,231,401 | 7/1993 | Kaman et al. | 342/55 |
| 5,418,608 | 5/1995 | Ciami et al. | 356/3.01 |
| 5,446,529 | 8/1995 | Stettner et al. | 348/162 |
| 5,467,122 | 11/1995 | Bowker et al. | 348/31 |

OTHER PUBLICATIONS

"Innovative range imager sees how targets measure up," by Ken Frazier, Sandria LabNews, vol. 46, No. 19, pp. 1–3, Sep. 16, 1994.

"The Lock–In CCD:Two–Dimensional Synchronous Detection of Light," by T. Spirig, P. Seitz, O. Vietze, and F. Heitger, IEEE Journal of Quantum Electronics, vol. 31, No. 9, pp. 1–5, Sep. 1, 1995.

"High–Resolution 3D Imaging for Non–cooperative Targets and Industrial Applications." p. 1, Nov. 14, 1994.

*Primary Examiner*—Anand S. Rao
*Attorney, Agent, or Firm*—Iandiorio & Teska; Brian J. Colandreo

[57] ABSTRACT

An improved three-dimensional imaging system for imaging an object having a number of resolvable elements including: an amplitude modulated radiation source for transmitting radiation to the object; at least one photoelectric image detector; a gating circuit for synchronously enabling at least one of the detectors during at least three portions of the period of the modulated radiation source for detecting radiation reflected from the object; and a 3-dimensional image computer having a first routine for calculating the phase angle between the transmitted radiation and the reflected radiation and a second routine, responsive to the calculated phase angle, for calculating the range of the number of elements of the object with respect to each other.

26 Claims, 9 Drawing Sheets

THREE-DIMENSIONAL IMAGING SYSTEM

FIELD OF INVENTION

This invention relates to an improved three-dimensional imaging system.

BACKGROUND OF INVENTION

Visible and infrared imaging systems are useful in many applications such as, for example, in military applications to provide essential information relative to surveillance, remote observations, night vision, and guided weapons control as well as commercial applications for industrial, transportation, space and environmental use. Conventional imaging systems, however, generally provide only two-dimensional imaging, and many of the above military and commercial applications, require three-dimensional imaging. For these and other applications laser range finders have been used to augment conventional two-dimensional imagers by providing single-point ranging. However, the usefulness of these systems is limited, in that they are incapable of imaging multiple objects within a scene.

Scanning lidar systems are capable of imaging and ranging multiple objects within an image scene, but their response time is slow and is limited by the time it takes to rasterscan the full scene. Thus, these systems do not provide real time three-dimensional imaging. Other three-dimensional imaging systems utilize a stereoscopic technique which requires multiple cameras at multiple observation sights. These systems require a significant amount of hardware and are very costly. Yet another type of three-dimensional imaging system illuminates a scene to be imaged and uses the returned light intensity data to accomplish ranging of objects within the scene. However, variations in scene illumination are a major problem. Also since many objects have variations in reflectivity over their surfaces and different objects have different reflectivities, inaccuracies in ranging are common.

SUMMARY OF INVENTION

It is therefore an object of this invention to provide an improved three-dimensional imaging system which provides real-time three-dimensional imaging.

It is a further object of this invention to provide such a three-dimensional imaging system which is capable of imaging multiple objects in complex scenes.

It is a further object of this invention to provide such a three-dimensional imaging system which provides three-dimensional imaging from a single location rather than from multiple locations as required with stereoscopic techniques.

It is a further object of this invention to provide such a three-dimensional imaging system which does not rely on illumination intensity data to accomplish the ranging function.

It is a further object of this invention to provide such a three-dimensional imaging system which requires less hardware and is less costly than conventional stereoscopic systems.

This invention results from the realization that an improved three-dimensional imaging system capable of providing real time imaging of objects including a plurality of resolvable elements can be achieved by providing amplitude modulated radiation to an object; detecting, during at least three different portions of the period of the amplitude modulated radiation, radiation reflected from the object; calculating the phase angle between the transmitted radiation and the reflected radiation; and, from the phase angle, calculating the range of the plurality of resolvable elements of the object with respect to each other.

This invention features a three-dimensional imaging system for imaging an object including a plurality of resolvable elements. The system includes an amplitude modulated radiation source for transmitting radiation to the object and at least one photoelectric image detector. There are means for synchronously enabling the at least one detector during at least three portions of the period of the modulated radiation source for detecting radiation reflected from the object. There are means for calculating the phase angle between the transmitted radiation and the reflected radiation and means, responsive to the means for calculating the phase angle, for calculating the range of the plurality of elements of the object with respect to each other.

In a preferred embodiment the radiation source may be a sinusoidally amplitude modulated radiation source. The radiation source may include a laser source for illuminating the object. The radiation source may include a light emitting diode. The at least one photoelectric image detector may be a CCD imager. There may be one photoelectric image detector which includes means, responsive to the means for synchronously enabling, for detecting radiation during the at least three portions of each period of the amplitude modulated radiation source. There may be three photoelectric image detectors and the means for synchronously enabling may include means for enabling a different detector during each of the at least three portions of each period of the amplitude modulated radiation source. The at least one detector may be enabled every one third period of the amplitude modulated radiation source. The means for calculating the phase angle may include means for calculating the phase angle between the transmitted radiation and the radiation received by the system reflected from each of the plurality of elements. There may further be included means, responsive to the at least one photoelectric image detector, for generating a two-dimensional reflectance image of the object from the detected radiation reflected from the object. There may further be included means, responsive to the means for calculating the range, for generating a display of the range of the plurality of elements with respect to each other. There may further be included means, responsive to the means for calculating the range, for generating a display of a three-dimensional image of the object including the range of the plurality of elements with respect to each other. There may further be included means, responsive to the means for calculating the phase angle, for calculating the absolute range of the plurality of elements to the imaging system. The means for calculating the absolute range may include means for calculating a first set of phase angles between the transmitted radiation and the radiation received by the system reflected from each of the plurality of elements with the amplitude modulated radiation source transmitting at a first frequency; means for adjusting the frequency of the amplitude modulated radiation source to a second frequency; means for calculating a second set of phase angles between the transmitted radiation and the radiation received by the system reflected from each of the plurality of elements at the second frequency; and means, responsive to the first and second sets of phase angles and the first and second frequencies, for determining the absolute range of the plurality of elements from the system. There may further be included means responsive to the means for calculating the absolute range, for generating a display of the absolute range of the plurality of elements to the imaging system. There may further be included means, responsive to the means for calculating the absolute range and the means for generating a two-dimensional reflectance image, for generating a display of a three-dimensional image of the object including the absolute range of the plurality of elements to the imaging system. There may further be included means for compensating for Doppler effects introduced to the system due to relative motion of the system and the object. The means for compensating may include means for repeatedly obtaining an average calculated phase angle between the transmitted and reflected radiation over a plurality of successive predetermined time periods. There may further be included means for determining whether there has been a change in any two or more successive calculated average phase angles obtained and means for adjusting the means for synchronously enabling to change the frequency of enablement of the detector to force the calculated average phase angle to be equal over the plurality of successive predetermined time periods to compensate for Doppler effects.

This invention also features a three-dimensional imaging system for imaging an object including a plurality of resolvable elements. The system includes a sinusoidally amplitude modulated illumination source for illuminating the object to be imaged. There is at least one synchronously gated CCD imager and means for synchronously enabling the at least one CCD imager during at least three portions of the sinusoidal period of the modulated illumination source for detecting illumination reflected from the object. There are means for calculating the phase angle between the transmitted illumination and the reflected illumination. There are means, responsive to the means for calculating the phase angle, for calculating the range of the plurality of elements of the object with respect to each other. There are means, responsive to the means for calculating the range, for displaying the range of the plurality of elements of the object with respect to each other.

This invention additionally features a three-dimensional imaging system for imaging an object including a plurality of resolvable elements. The system includes a sinusoidally amplitude modulated illumination source for illuminating the object to the image and at least one synchronously gated CCD imager. There are means for synchronously enabling the at least one CCD imager during at least three portions of the sinusoidal period of the modulated illumination source for detecting illumination reflected from the object. There are means, responsive to the at least one CCD imager, for generating a two-dimensional reflectance image of the object from the detected illumination reflected from the object. There are means for calculating the phase angle between the transmitted illumination and the reflected illumination and means, responsive to the means for calculating the phase angle, for calculating the range of the plurality of elements of the object with respect to each other. There are means, responsive to the means for calculating the range and the means for generating a two-dimensional reflectance image, for generating a display of a three-dimensional image of the object including the range of the plurality of elements of the object with respect to each.

This invention further features a three-dimensional imaging system for imaging an object including a plurality of resolvable elements. The system includes an amplitude modulated radiation source for transmitting radiation to the object. There are at least three photoelectric image detectors and means for synchronously enabling the detectors during a different portion of the period of the modulated radiation source for detecting radiation reflected from the object. There are means for calculating the phase angle between the transmitted radiation and the reflected radiation and means, responsive to the means for calculating the phase angle, for calculating the range of the plurality of elements of the object with respect to each other.

DISCLOSURE OF PREFERRED EMBODIMENT

Other objects, features and advantages will occur to those skilled in the art from the following description of a preferred embodiment and the accompanying drawings, in which.

Figure 1:
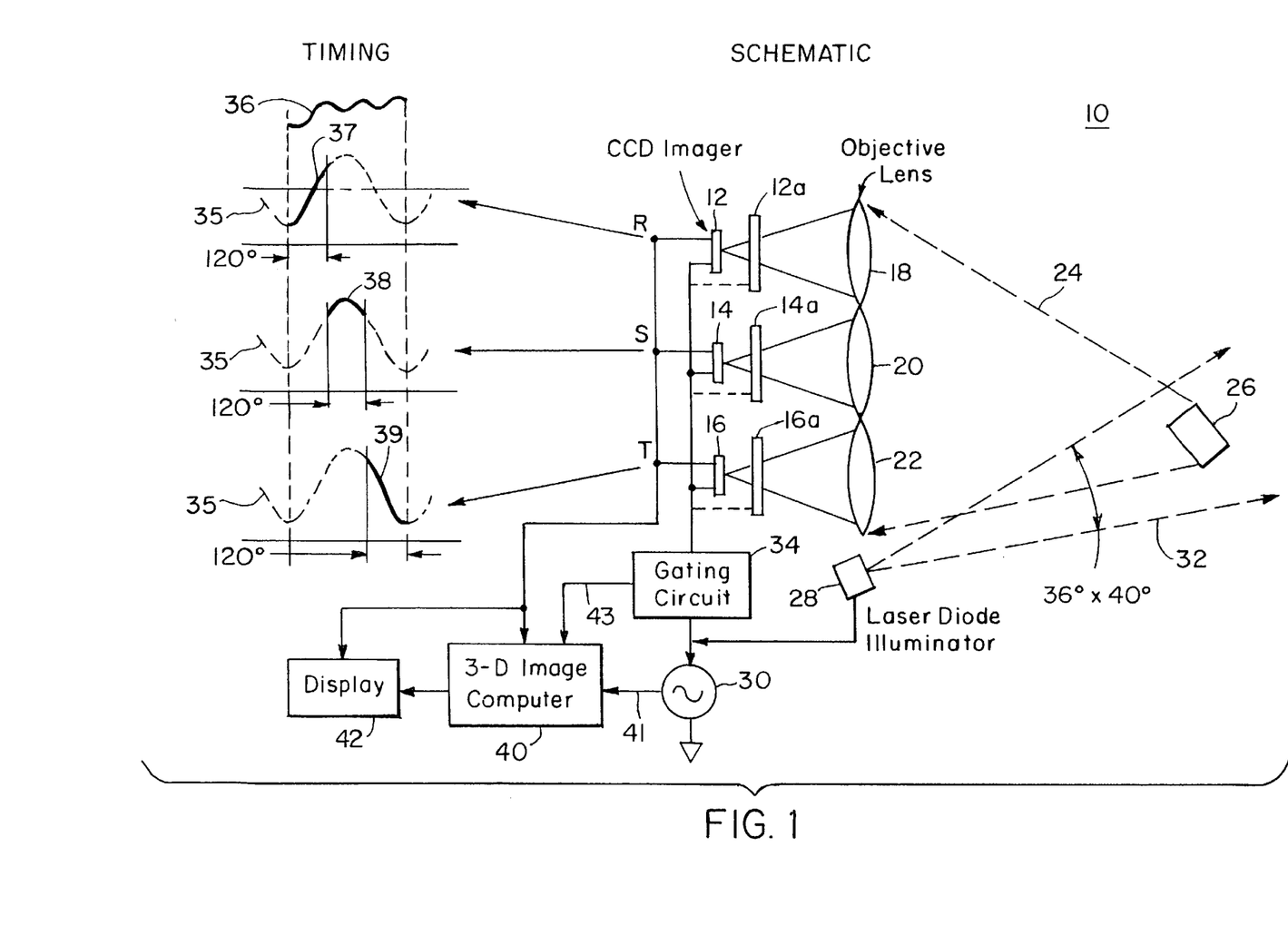
FIG. 1 is a schematic view of a three-dimensional imaging system according to this invention including timing diagrams for gating the CCD imagers.

There is shown in FIG. 1 improved three-dimensional imaging system 10 which includes three identical CCD imagers 12, 14 and 16. Objective lenses 18, 20 and 22 receive and focus onto CCD imagers 12, 14 and 16 illumination 24 reflected from the surface of object 26 to be imaged. Illumination 24 reflected from object 26 emanates from illumination source 28 which may be a laser diode illuminator, such as an LDP4500C laser diode, a diode pumped solid state laser illuminator or a light emitting diode (LED), sinusoidally modulated at high frequency, for example, 1 MHz by sine wave generator 30 to emit illumination beam 32 to fill the imager(s) field(s) of view. An illumination emission wavelength of 808 nm is typically used as it is near the peak response of CCD imagers 12, 14, and 16. Although only one object to be imaged is shown, this is not a necessary limitation of this invention as any number of objects within the field of view of system 10 are capable of being imaged providing the number of CCD pixels is sufficient to resolve them.

Figure 8:
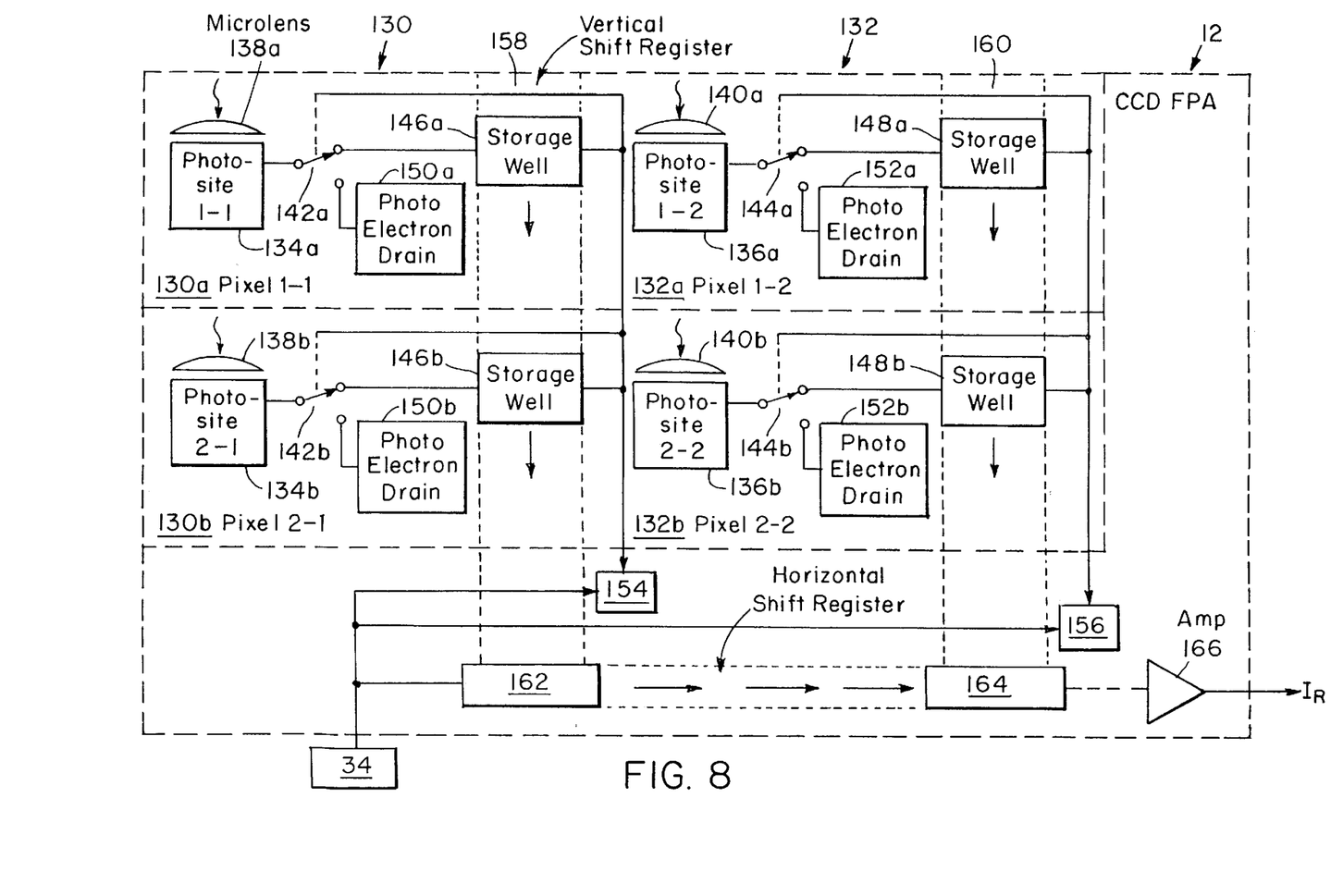
FIG. 8 is a schematic block diagram of one of the three synchronously gated CCD imagers of FIG. 1.

Gating circuit 34 driven by sine wave generator 30 shutters the input of illumination 24 to each of the CCD imagers such that each imager is turned on during a different portion of each cycle of sinusoidally modulated illumination beam 32, as described in detail below with regard to FIG. 8. CCD imagers 12, 14 and 16 may alternatively be gated by positioning optical shutters 12a, 14a and 16a in front of the CCD imagers. The optical shutters may be implemented with, for example, gated microchannel plate imagers, gated proximity focused image intensifiers, electronically switched Pockel's cells, liquid crystal shutters or mechanical shutters.

Circuit 34 gates CCD imagers 12, 14 and 16 in synchronism with the modulation frequency 35 of transmitted illumination 32 such that each imager is turned on or is opened during a different portion of each full cycle 36 and off or closed during the remainder of each cycle. In this example CCD imagers 12, 14 and 16 are turned on for 120° (or less) portions 37, 38 and 39, respectively, of each cycle 36 of sine wave 35 and off for the remainder of each cycle a significant number of times, e.g. up to approximately 33,000 times for 1 MHz modulation frequency, per each CCD image frame time of 1/30 second. At the end of each image frame time the average intensity levels $I_R$, $I_S$ and $I_T$ from each CCD pixel are read out of the CCD imagers and provided to display 42. The intensity levels of the corresponding pixels from each of the three CCD imagers (i.e. pixel (1, 1) from each CCD imager) are summed and an average pixel intensity level or a reflectance level $R_{IJ}$ for each pixel, where I and J correspond to the X and Y pixel locations, can be provided to display 42 for display of the two dimensional reflectance image of object 26. The intensity levels $I_R$, $I_S$ and $I_T$ could alternatively be used for other various external applications.

Also at the end of each image frame time the intensity levels from each pixel of CCD imagers 12, 14 and 16, $I_R$, $I_S$ and $I_T$, respectively, are provided to three-dimensional image computer 40 which determines the phase angle between transmitted illumination 32 and illumination 24 received at each pixel. From the phase angle, the distance along the optical axis from system 10 to each resolved element of object 26 (i.e. each element of the object imaged by a pixel) is computed. It should be noted that, for example, pixel (1,1) of each CCD imager resolves the same element of object 26, thus only a single distance is computed from pixel (1,1) to an element on object 26 using intensity information from pixels (1,1) of each imager. If the distance from system 10 to object 26 exceeds one half wavelength of the modulation frequency then the distances from system 10 to each resolved element on object 26 are only relative modulo $\lambda/2$ distances. In other words, this information reveals only the position of each resolved element relative to other resolved elements with respect to system 10. This relative distance information is provided at the end of every image frame time to display 42. The absolute distance from system 10 to each image element of object 26 resolved can also be calculated by three-dimensional image computer 40 and provided to display 42. The third dimension of the image (either relative or absolute) can be combined with the two-dimensional reflectance image to form a three-dimensional image which is displayed on display 42, e.g. as an isometric display.

One method used to determine the absolute distance from system 10 to each resolved element of object 26 requires the temporary adjustment of the modulation frequency which is accomplished by providing an adjustment signal over line 41 to sine wave generator 30. This process is described in detail below with regard to FIG. 6.

Figure 5:
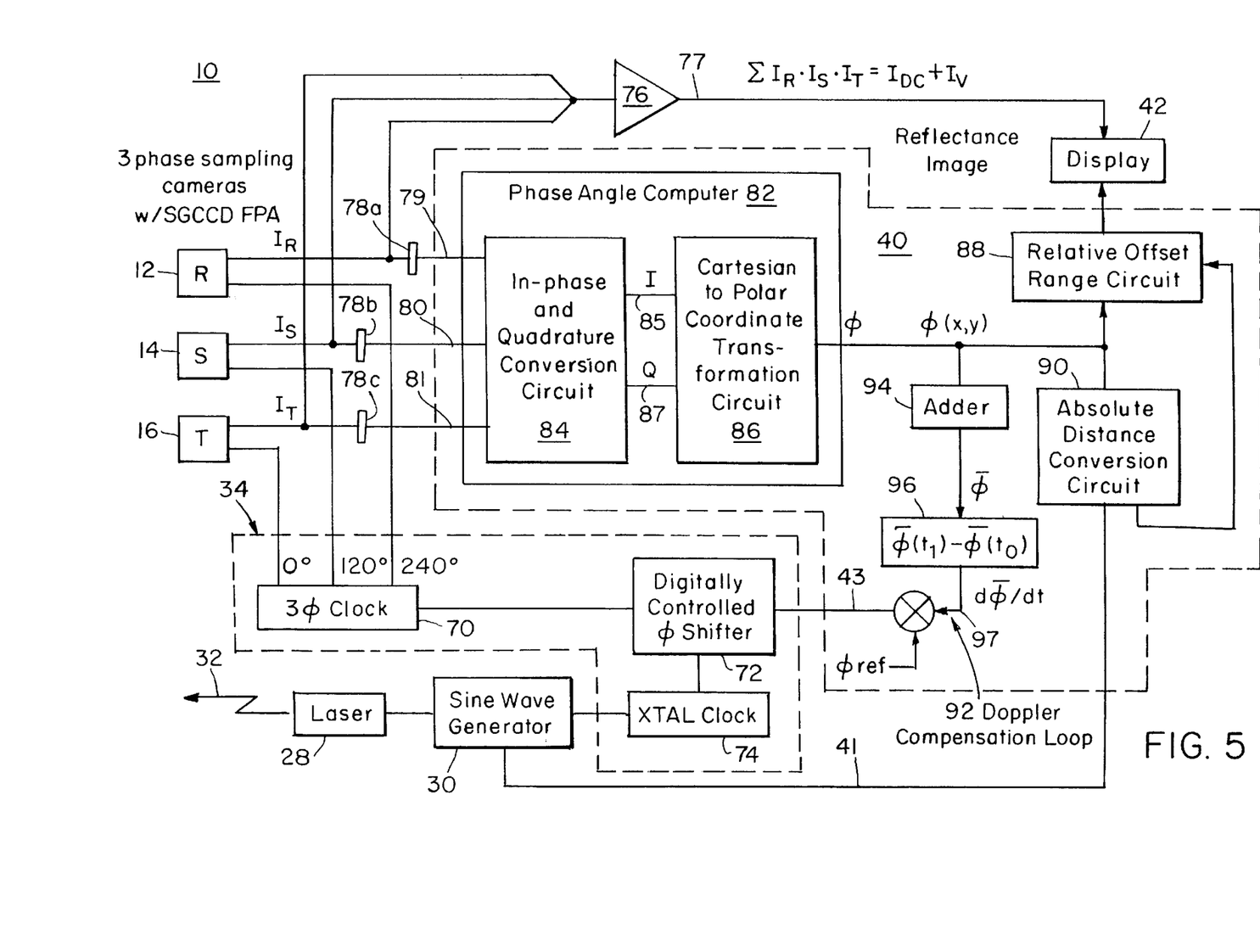
FIG. 5 is a detailed schematic block diagram of the system shown in FIG. 1.

Three-dimensional image computer 40 also compensates for Doppler effects due to relative movement of system 10 and object 26 by adjusting the frequency of the on and off gating signals to CCD imagers 12, 14 and 16 relative to the source modulation frequency. This process, described in detail below with regard to FIG. 5, is accomplished by providing an adjustment signal over line 43 to gating circuit 34.

Figure 2A:
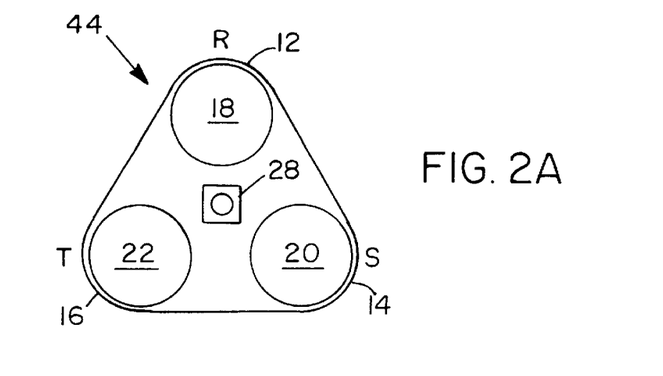
FIG. 2A is a schematic view of the optical head of the system of FIG. 1.

Optical head 44, FIG. 2A, is typically configured with objective lenses 18, 20 and 22 co-aligned and with illumination source 28 approximately centered about the lenses. Optical head 44 is configured such that the corresponding pixels of each CCD imager receive reflected illumination 24 from the same element of object 26 and thus each resolve the same element of object 26.

Figure 2B:
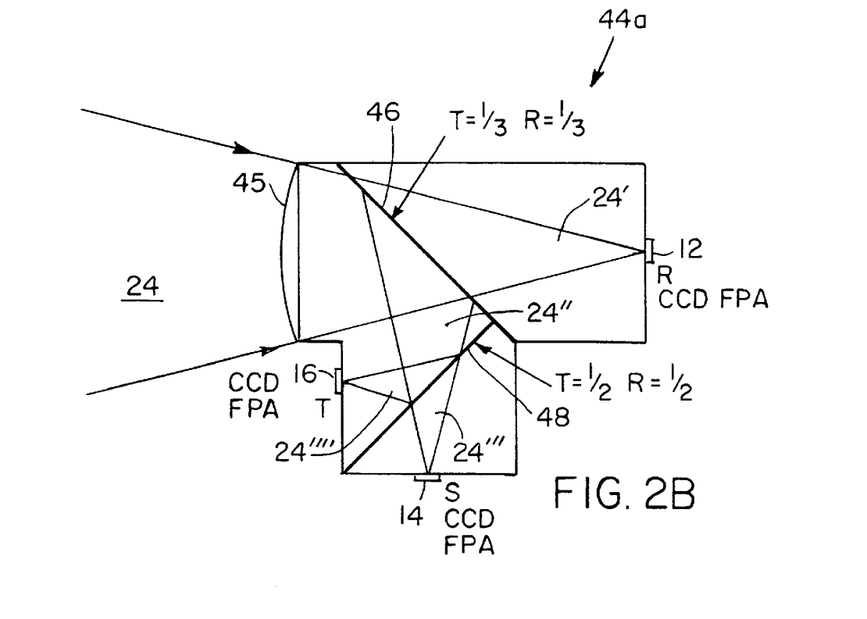
FIG. 2B is a cross-sectional view of an alternative optical head for the system of FIG. 1.

Alternative optical head 44a, FIG. 2B, has only a single objective lens 45 which receives incoming reflected illumination 24. One third of reflected illumination 24 passes through partially transmissive mirror 46 as indicated at 24' and is focussed on CCD imager 12, while the remaining two thirds of the incoming illumination 24 is reflected off the surface of mirror 46 and is directed to partially transmissive mirror 48 as indicated at 24". Mirror 48 passes one half of the remaining illumination (24''') to CCD imager 14 and the other half of the illumination (24'''') is reflected onto the surface of CCD imager 16. Although not visible in this figure, illumination source 28 is located proximate objective lens 45. Each corresponding pixel of the CCD imagers 12, 14 and 16 also each receive the same reflected illumination 24 from object 26 and thus each resolves the same element of object 26.

Figure 2C:
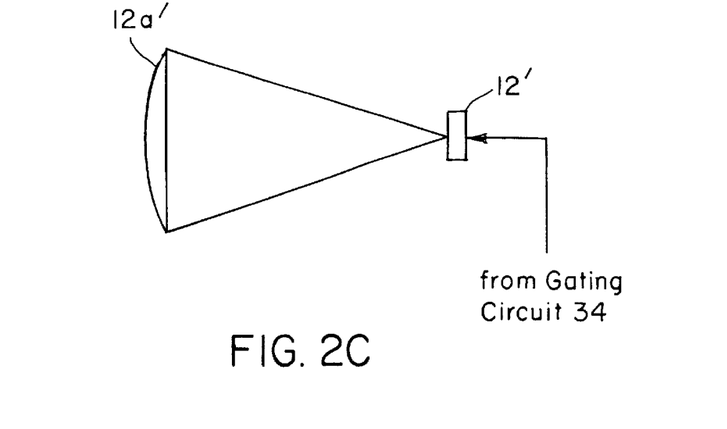
FIG. 2C is a cross-sectional view of an alternative optical head for the system of FIG. 1.

FIG. 2C shows a configuration using a single CCD imager 12' and objective lens 12a' capable of simultaneously gating and integrating the three samples per cycle of the modulated radiation. Imagers having this capability are being fabricated by D. Gardner of SMD, Inc., Colorado Springs, Colo. and are described in the article by T. Spirig, P. Seitz, O. Vietze, and F. Heitzger, "The Lock-In CCD—Two-Dimensional Synchronous Detection of Light" *IEEE Journal of Quantum Electronics*, Vol. 31, No. 9, September 1995 incorporated herein in its entirety by reference. Gating circuit 34, FIG. 1, provides the gating signals to CCD imager 12' to synchronously gate imager 12' to obtain at least three samples per cycle, as described below with regard to FIG. 9.

Figure 3:
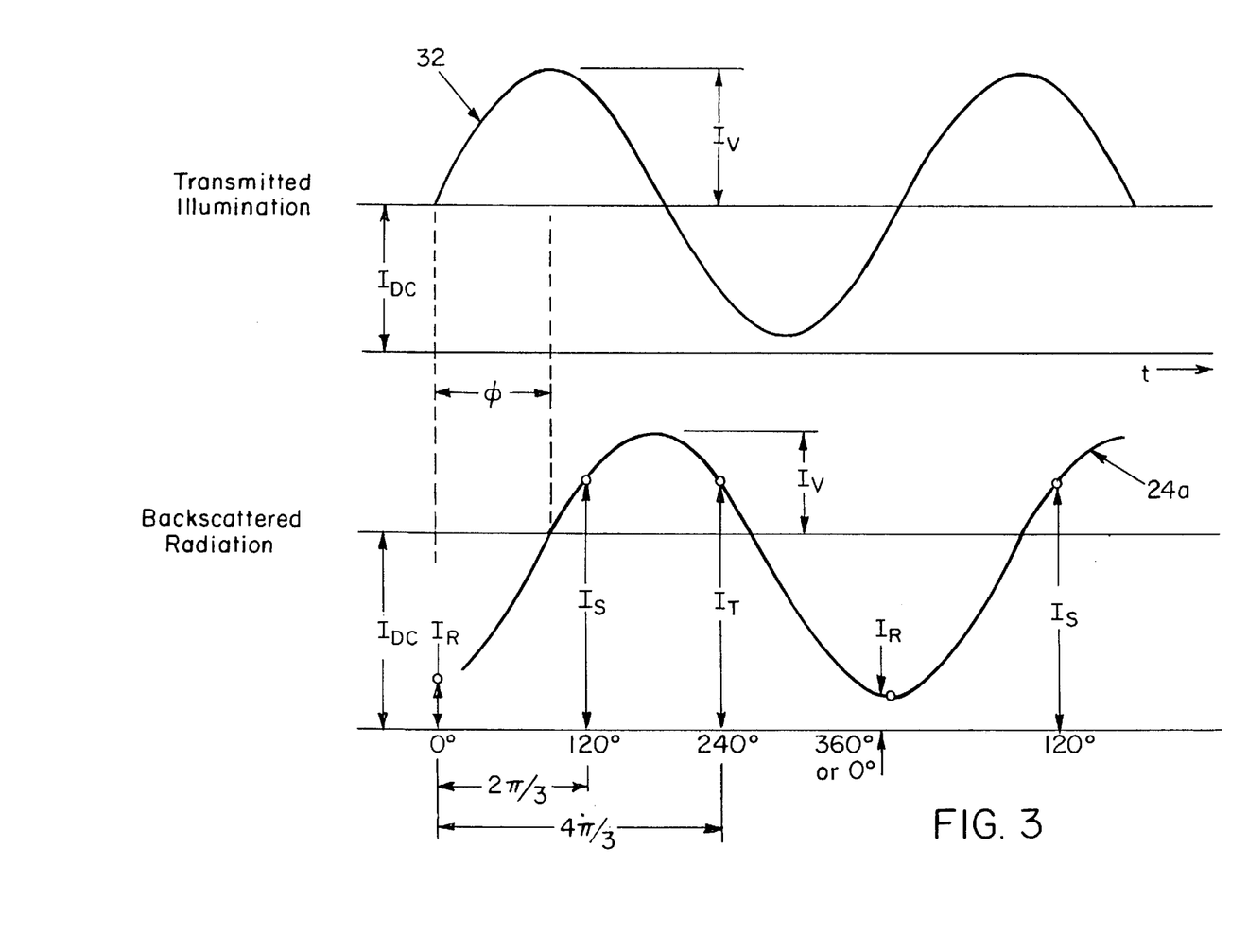
FIG. 3 is a plot of illumination transmitted from and received by the system of FIG. 1.

Transmitted illumination 32, FIG. 3, is modulated at an intensity level $I_V$ about a mean DC level $I_{DC}$ at a modulation frequency of, for example, 1 MHz. The reflected or back scattered illumination 24a received, for example, by one pixel of CCD imagers 12, 14 and 16 is shown to be shifted in phase by an angle ø. This phase shift can be used to compute the distance of the element of object 26, FIG. 1, resolved by that one pixel with respect to system 10. By determining the phase shift of reflected light received by the other pixels, the relative offset distances among the elements with respect to system 10 can be calculated. Absolute distances of the resolved elements of object 26 to system 10 can also be determined.

In order to determine the phase angle difference, ø, between the transmitted and received illumination irrespective of the mean DC level $I_{DC}$ and the modulation intensity level $I_V$, which will be attenuated as the illumination is propagated to and reflected off the object 26, intensity levels of received illumination 24 must be monitored during at least three portions of each cycle of the modulation frequency of transmitted illumination 32 over each image frame time either by using at least three CCD imagers or by using a single CCD imager which is capable of gating and integrating at least three samples per cycle of the modulated radiation. At the end of each image frame time the intensity levels of illumination accumulated over the frame time during the three portions of each cycle are used, as described below, to calculate the phase angle of the illumination received at each pixel location.

In synchronism with the modulation frequency of transmitted illumination 32, from 0° to an angle up to a maximum of 120°, CCD imager 12 is gated on and is receiving reflected illumination 24a while CCD imagers 14 and 16 are gated off, thus preventing their reception of reflected illumination 24a during this time period. At 120°, CCD imager 14 is gated on for the same sample period and is receiving reflected illumination 24a while CCD imagers 12 and 16 are gated off, thus preventing their reception of reflected illumination during this period. At 240°, CCD imager 16 is gated on for the same sample period and is receiving reflected illumination 24a while CCD imagers 12 and 14 are gated off, thus preventing their reception of reflected illumination during this period. This completes one full cycle of receiving illumination 24a in synchronism with the modulation frequency of transmitted illumination 32. While different gating periods may be used, the optimum gating time is ⅙ of each cycle or 60° for each CCD imager to be gated on. To uniquely define the modulation phase angle three samples per cycle are required. Optimum spacing between the samples is 120°.

This process continues until the end of each image frame time when signals $I_R$, $I_S$ and $I_T$ for each pixel corresponding to the received illumination 24 accumulated in each pixel of the CCD imagers are provided to three-dimensional image computer 40 where the phase angle difference ø at each pixel (1, J) is determined. From the computed phase angles $ø_{IJ}$ at each pixel (I, J) the ranges or distances $z_{IJ}$ between system 10 and each resolved element of object 26 can be calculated. If system 10 is located more than one half wavelength from object 26, the calculated distances $z_{IJ}$ are relative modulo λ/2 offset distances and not absolute distances. That is, these distances indicate that, for example, one resolved element of object 26 is 10 cm closer to system 10 than another resolved element, rather than indicating that the one element of object 26 is 200 meters from system 10 and the other element is 200.1 meters from system 10.

The phase angle of the transmitted illumination 32 is typically set at 0 radians, therefore, the calculated phase angle $ø_{RCV}$ of received illumination 24, FIG. 1, at each pixel location can be used to calculate distance z of each resolved element (i.e. the element on object 26 resolved by a given pixel location) to system 10 according to the following formula:

$$2z=(c/f_m)(ø_{RCV}/2\pi) \quad (1)$$

where c is the speed of light, $f_m$ is the modulation frequency of the transmitted illumination and $ø_{RCV}$ is the phase angle in radians of the received illumination reflected from a resolved element of object 26.

Figure 4:
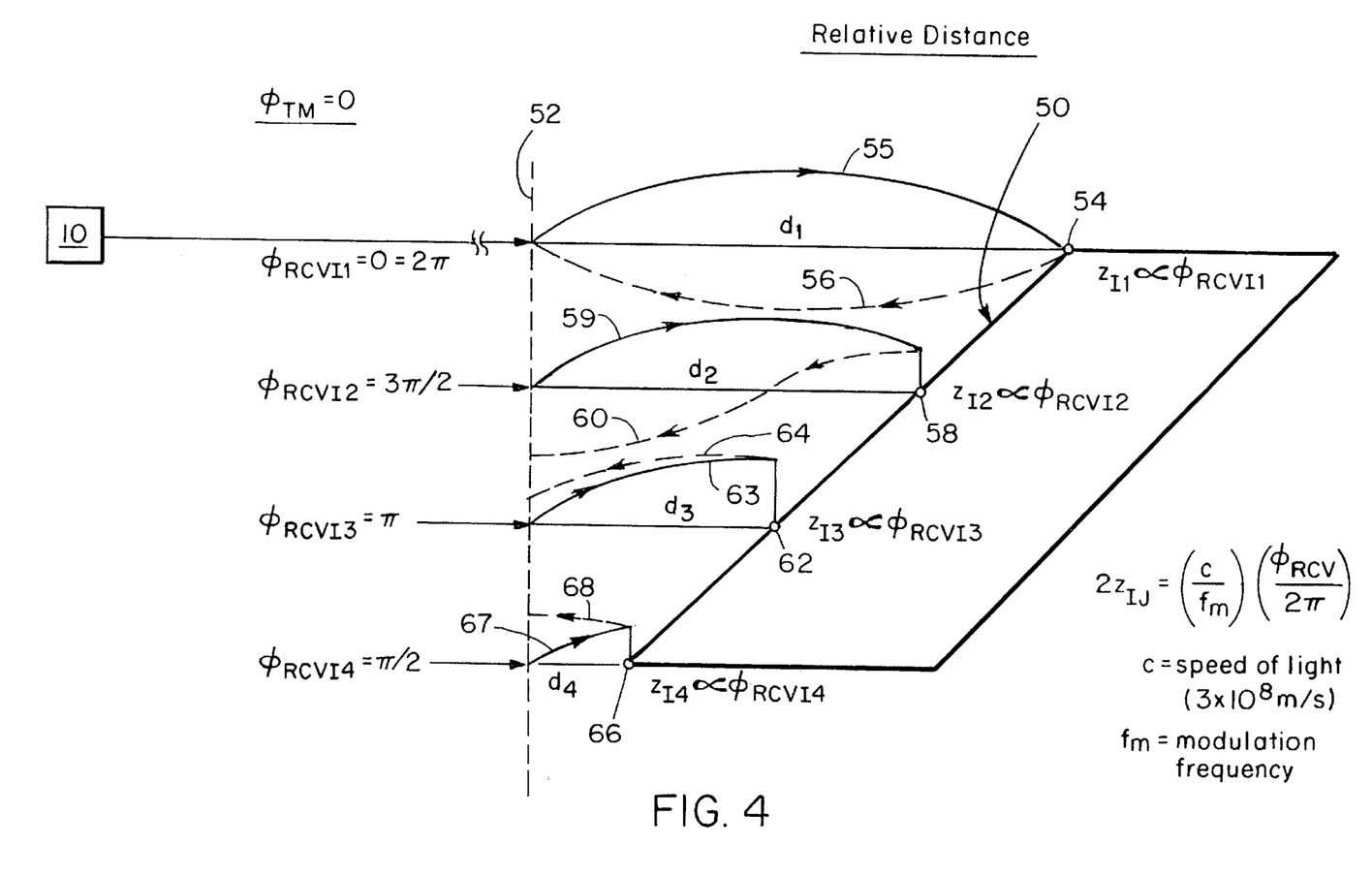
FIG. 4 is a side elevational view of illumination transmitted to and reflected from the surface of an object to be imaged according to this invention.

The determination of the distances $z_{IJ}$ from discrete elements of an object to system 10 is illustrated with regard to surface 50, FIG. 4, which is positioned an unknown distance from system 10 greater than the distance of one half wavelength of the modulation frequency. Thus, by calculating z according to formula (1) for each resolved element only the relative modulo λ/2 distance from an arbitrary plane 52 in space located at a distance equal to one half of the modulation frequency wavelength can be determined. Element 54 on surface 50 receives transmitted illumination 55 and reflects illumination 56 which is received and resolved, for example, by pixel (I, 1) of system 10. System 10 calculates the phase angle $ø_{RCV1}$ of the light received by the pixel to be 0 radians. Element 58 on surface 50 is located closer to system 10 than element 54, thus when transmitted radiation 59 impinges upon element 58 it reflects illumination 60 which when received and resolved, for example, by pixel (I, 2) of system 10 with a phase angle $ø_{RCV2}$ equal to 3π/2 radians. Element 62 on surface 50 is even closer to system 10 than element 58 and it receives transmitted illumination 63 and reflects illumination 64 which is received and resolved, for example, by pixel (I, 3) of system 10 with a phase angle $ø_{RCV3}$ of π radians. Element 66 on surface 50, the closest point to system 10, receives transmitted illumination 67 and reflects illumination 68 which is received and resolved by, for example, pixel (I, 4) with a phase angle $ø_{RCV4}$ of π/2 radians. Distances $z_{I1}$–$z_{I4}$ can be calculated by inserting phase angles $ø_{RCV1}$–$ø_{RCV4}$ into equation (1). Since distance $z_4$ for Element 66 is the smallest, it is the closest to object 26 and is designated as the reference point. All distances with larger values are further from object 26. For example distances $z_{I4}$–$z_{I1}$ may be calculated to be 2, 4, 6 and 8 cm, respectively. Thus, element 66 may be designated as the zero point with the other elements 2, 4 and 6 cm further away from system 10 than element $z_{I4}$.

System 10, shown in detail in FIG. 5, includes three phase clock 70 within gating circuit 34 which is interconnected with CCD imagers 12, 14 and 16 to turn these imagers on at 0°, 120° and 240°, respectively, of the modulation frequency of transmitted illumination 32 to collect illumination 24 reflected from object 26. Three phase clock 70 is driven by digitally controlled phase shifter 72, the operation of which is described below, and external clock 74 whose input is a sine wave reference signal from source 30 which modulates transmitted illumination 32 from illumination source 28. While these imagers are off, they are receiving reflected illumination 24 but are prevented from collecting photoelectrons. At the end of each image frame time, typically ⅟₃₀ second, each imager 12, 14 and 16 outputs intensity signals $I_R$, $I_S$, and $I_T$ for each pixel which corresponds to the amount of illumination received by each pixel of each imager during their "on" times. Amplifier 76 sums the three signals and provides a reflectance image, $R_{IJ}$, for each pixel over line 77 to display 42 or for other usage. The intensity signals $I_R$, $I_S$ and $I_T$ for each pixel are converted to digital values by analog to digital converters 78a–c, respectively, and the digital values are provided over lines 79, 80 and 81 to phase angle computer 82 which calculates the phase angle of illumination received at each pixel of the CCD imagers as follows. The process of gating the imagers during three portions of each cycle of transmitted illumination 32 namely, 0°, 120° and 240°, produces three DC-baseband images of the form:

$$\bar{I}_R = I_{DC} + I_V \cos(\phi + \phi_0), \quad (2)$$
$$\bar{I}_S = I_{DC} + I_V \cos\left(\phi + \phi_0 + 2\frac{\pi}{3}\right), \text{ and}$$
$$\bar{I}_T = I_{DC} + I_V \cos\left(\phi + \phi_0 + 4\frac{\pi}{3}\right),$$

where the bars above $I_R$, $I_S$, and $I_T$ denote time averages within an image frame time (⅟₃₀ second) and $ø_0$ is the reference phase value. Assuming the three CCD imagers 12, 14 and 16 have equal gain or responsivity, or have been adjusted to be so, then the $I_{DC}$ and $I_V$ terms in each equation are identical. With the three equations, $ø_{IJ}$, on a pixel by pixel basis can be solved by taking the three pixel stream intensity values $I_R$, $I_S$ and $I_T$ from each imager 12, 14 and 16 supplied over lines 79, 80 and 81 to phase angle computer 82 within three-dimensional image computer 40. Within phase angle computer 82 in-phase and quadrature conversion computation is performed by in-phase and quadrature conversion circuit 84 such as a digital signal processor or the equivalent which condenses the three phases down to two phase values 90° apart. Digitized in-phase signal (I) which is equal to $$I = I_V \cos(\phi + \phi_0) \quad (3)$$

is supplied over line 85 to cartesian-to-polar coordinate transformation circuit 86 such as a Raytheon TMC 2330 or any other high speed phase processor on a pixel by pixel basis. Digitized quadrature signal (Q) equal to $$Q = I_V \sin(\phi + \phi_0) \quad (4)$$

is supplied over line 87 also to cartesian-to-polar coordinate conversion circuit 86 on a pixel by pixel basis. The phase angle, $\phi_{IJ} = \tan^{-1} I/Q$, is solved for each pixel of the CCD image in circuit 86. Using equation (1) above and the determined phase angle $\phi_{IJ}$ for each pixel, the relative offset distance of each element of an object resolved by the CCD imagers is calculated in relative offset range circuit 88 which may be a digital signal processor that performs a relative offset range algorithm. The relative offset distances of each pixel location/resolved element are supplied to display 42. The relative range information from relative offset range conversion circuit 88 can be used to display a three-dimensional image on display 42. Three-dimensional imaging displays are commercially available from, for example, NuVision, (SGS60 Stereotek), and Dimension Technologies, Inc., (DTI1100C). The acquired 3-dimensional image data need not be provided to a visual display. This data can be directly provided to any system requiring high speed, three dimensional image data.

Phase angle signals $\phi_{IJ}$ are also processed by an absolute distance conversion circuit 90 such as a digital signal processor that performs an absolute distance conversion algorithm which determines the absolute distance of each resolved point from system 10 and supplies that information to display 42 to display a three-dimensional image of the object including the absolute range of the object from system 10.

Both the phase angle and ranging computations are performed during the periods between CCD image collection frames when the image intensity data is being read out of the imagers. Accordingly system 10 provides real-time three-dimensional imaging.

Doppler compensation loop 92 is used to introduce a Doppler frequency shift when imaging system 10 is, for example, mounted on a moving platform, such as a helicopter, and is imaging a stationary object or if the object is moving and system 10 is stationary. Adder 94 receives n number of phase angles over a time period t and outputs an average phase angle to phase change determination circuit 96 which outputs over line 97 a signal, $d\bar{\phi}/dt$. This signal indicates the time averaged rate of change of the phase angle between, for example, time $t_1$ and time $t_0$ due to the Doppler effect which occurs because the object being imaged is moving relative to system 10. The $d\bar{\phi}/dt$ signal from line 97 is subtracted from a phase angle reference signal and the phase difference signal is supplied over line 43 to digitally controlled phase shifter 72 such as a digital signal processor within gating circuit 34 which alters the timing of the three phase clock signals in clock 70 to increase or decrease, as necessary, the frequency of the clock signals until, for example, $\bar{\phi}(t_1)$ is equal to $\bar{\phi}(t_0)$ and $d\bar{\phi}/dt$ is equal to zero.

For example, if system 10 and the object being imaged are moving relative to each other at a speed of 10 meters per second, $d\phi/dt$ is equal to 10 radians per second or 1.6 Hz. Thus, to compensate for Doppler effects the frequency of the three phase clock signals in clock 70 is increased from, for example, 1,000,000 Hz to 1,000,001.6 Hz which causes $d\phi/dt$ to be equal to 0.

As noted above, if system 10 is more than one wavelength away from the object being imaged the distances $z_{IJ}$ computed for each resolved element of the object are only relative modulo $\lambda/2$ distances. With the typical 1 MHz modulation frequency the measurement range is 150 meters. In other words, as long as the object being imaged is within 150 meters of system 10, the calculated distances $z_{IJ}$ are the absolute distances of each resolved element from system 10. However, if the object is greater than 150 meters from system 10, the distances $z_{IJ}$ are only relative modulo $\lambda/2$ distances.

Figure 6:
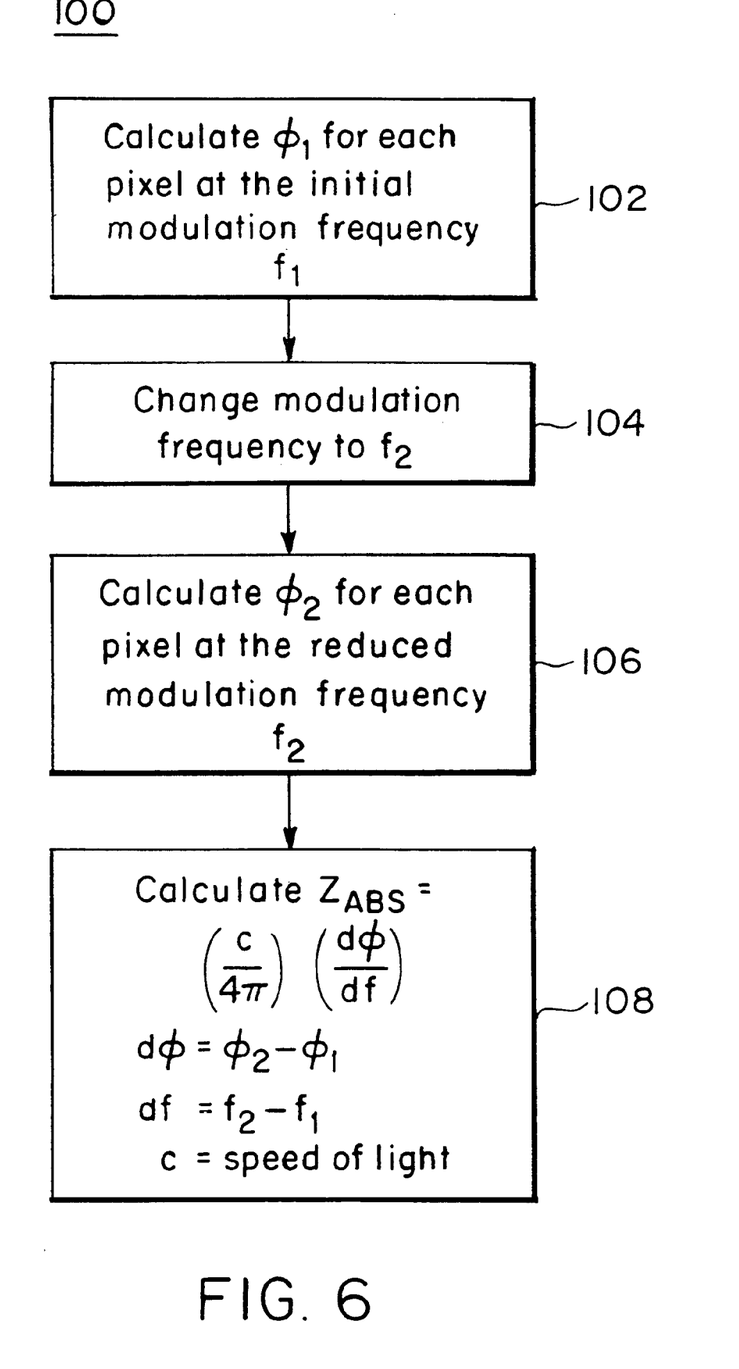
FIG. 6 is a flow chart depicting the operation of the absolute distance conversion circuit of FIG. 5.

Absolute distance conversion circuit 90, which operates according to flow chart 100, FIG. 6, is used to determine the absolute range of each resolved point on the imaged object to system 10. Circuit 90 calculates the phase angles $\phi_1$ for each pixel at the initial modulation frequency, $f_1$, in step 102. At step 104 the absolute distance conversion circuit 90, FIG. 5, by a signal over line 97, changes by a predetermined increment the modulation frequency of illumination source 28 by adjusting the output of sine wave generator 30 to $f_2$. At step 106 the phase angles q2 at the reduced modulation frequency, $f_2$, are calculated for each pixel. At step 108 the absolute range $Z_{ABS}$ for each pixel is calculated according to the following equation:

$$Z_{ABS} = \left(\frac{c}{4\pi}\right)\left(\frac{d\phi}{df}\right) \quad (5)$$

where c is the speed of light, $d\phi$ equals $\phi_1 - \phi_1$ and df equals $f_2 - f_1$. The absolute distance determination function of absolute distance conversion circuit 90 may be accomplished by other known techniques.

Figure 7:
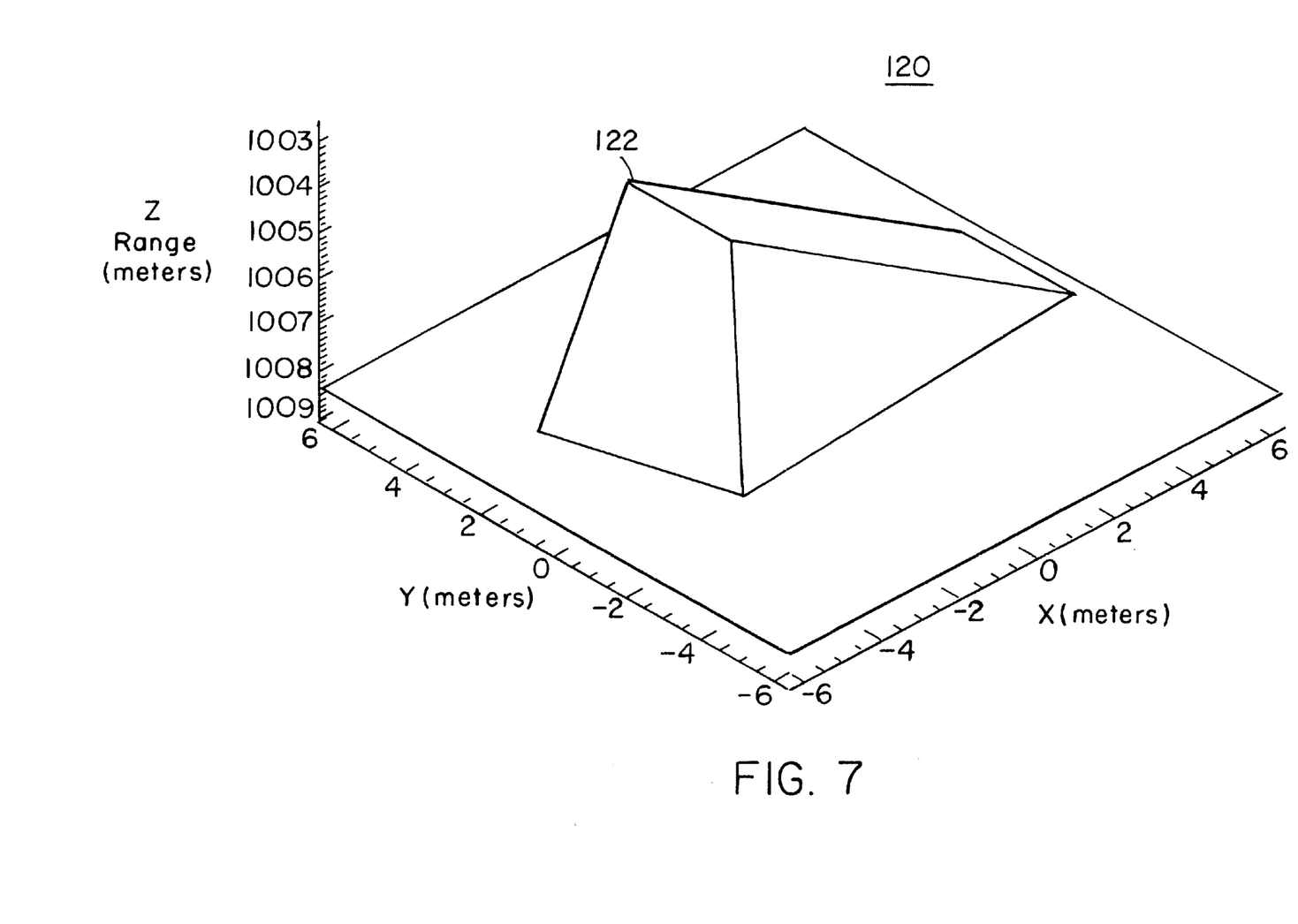
FIG. 7 is a three-dimensional display of an object according to this invention.

Display 120, FIG. 7, is a typical three-dimensional display of object 122 which may be generated using system 10 according to this invention. In this display the absolute distance of each resolved element of object 22 is displayed on the Z axis. This display could also be a display of the relative offset distance of each resolved element of object 122.

In order to accomplish the high speed shuttering necessary for three-dimensional imaging according to this invention, CCD imagers 12, 14 and 16 are configured to operate as synchronously gated high speed CCD imagers. The imagers' configuration is only depicted with regard to CCD imager 12, FIG. 8, as imagers 14 and 16 are identically configured.

CCD imager 12 includes a plurality of columns of photosensitive areas only two of which, 130 and 132, are shown. Each column incudes a plurality of pixels 130a–b and 132a–b. Although for clarity sake an array of only two columns with two pixels in each column is shown, a typical CCD imager for use in this invention would include, for example, an array of 512 columns with 512 pixels in each column. Each pixel includes a photosensitive area, such as areas 134a–b and 136a–b. Above each photosensitive area is included a microlens, such as lenses 138a–b and 140a–b, which increases the effective photosensitive area of each pixel to typically 80%. Photons incident upon CCD imager 12 from illumination 24, FIG. 1, reflected from object 26 generate photoelectrons which are collected or integrated by photosites 134a–b and 136a–b. The photoelectrons collected at the photosites are then selectively routed by means of switches 142a–b and 144a–b to either storage wells 146a–b and 148a–b, respectively, or to photoelectron drains 150a–b and 152a–b, respectively. Switches 142a–b and 144a–b are operated by a control signal from vertical shift registers 154 and 156 originating from gating circuit 34.

CCD imager 12, as with conventional CCD imagers, has a 1/30 second image frame time. However, as noted above, system 10, FIG. 1, requires the illumination input to CCD imager 12 (and CCD imagers 14 and 16) be gated many times during each image frame time. That is, system 10 requires that CCD imager 12 be turned on (to collect photoelectrons from reflected illumination 24) and off (to prevent collection of photoelectrons from reflected illumination 24) many times during each 1/30 second image frame time. Thus, when CCD imager 12 is to be gated on to collect photoelectrons from reflected illumination 24 once each cycle of sinusoidally modulated illumination beam 32 then gating circuit 34, through vertical shift registers 154 and 156, interconnects photosites 134a–b and 136a–b to storage wells 146a–b and 148a–b so that the photoelectrons are collected and stored in the storage wells. And, during the remainder of each cycle, gating circuit 34, through vertical shift registers 154 and 156, interconnects the photosites with photoelectron drains 150a–b and 152a–b so that the photoelectrons from the photosites are removed or drained away and prevented from being collected in the storage wells. In this switch position CCD imager 12 is gated off and the "shutter" to CCD imager 12 is effectively closed. When the switch is in the other position and the photoelectrons from the photosites are routed to the storage wells the "shutter" to CCD imager 12 is effectively opened.

In the example of FIG. 1, CCD imager 12 is gated on (shutter open) from 0° to 120° of each cycle of the modulation frequency of transmitted illumination 32 and gated off (shutter closed) for the remainder of the cycle. When any one CCD imager is gated on by gating circuit 34, the other two CCD imagers are simultaneously gated off. The electronic shuttering or gating can operate at rates up to approximately 3 MHz. Accordingly, the CCD imagers 12, 14 and 16 can each be gated on and off to obtain as many as approximately 33,000 samples for each imager during each 1/30 second image frame time which are accumulated in the storage wells.

At the end of each 1/30 second frame time all of the photoelectrons which were accumulated over the image frame time in storage wells 146a–b and 148a–b are shifted down storage well columns 158 and 160 by means of vertical shift registers 154 and 156, respectively. Vertical shift registers 154 and 156 shift the contents of the storage wells to horizontal shift registers 162 and 164 which then output through amplifier 166, pixel by pixel, serial reflectance image $I_R$. The output from CCD imager 12 is supplied to both amplifier 76 and phase angle computer 82 (FIG. 5) where, in conjunction with the outputs from imagers 14 and 16, it is used to display the two-dimensional reflectance image on display 42 and to calculate the phase angle of illumination 24 reflected from object 26 to each pixel of the CCD imagers 12, 14 and 16.

CCD imagers 12, 14 and 16 may be gated by other means which may be apparent to those skilled in the art as long as the gating means are capable of turning each CCD imager on and off with sufficiently high frequency. The higher the frequency for gating the CCD imagers the lower are the minimum detectable range differences. Three-dimensional imagers with shorter minimum resolvable range have greater applicability.

Figure 9:
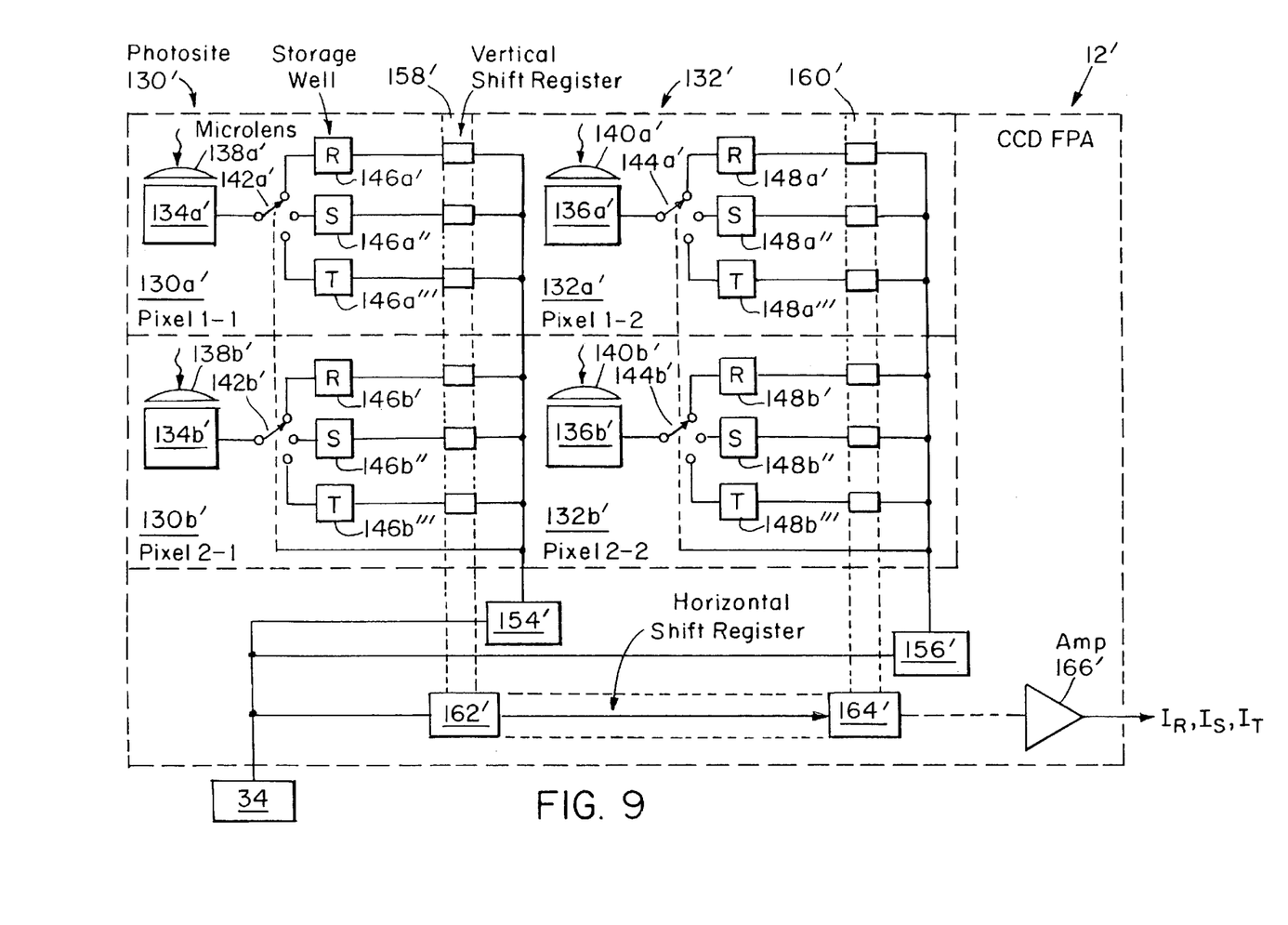
FIG. 9 is a schematic block diagram of the synchronously gated CCD imager of FIG. 2C.

Alternatively, if a single CCD imager, such as CCD imager 12', FIG. 2C, is used it is configured as shown in FIG. 9. In this embodiment each photosite is selectively interconnected with three storage wells. Photosites 134a' and 134b' are selectively interconnected with storage wells 146a' (R), 146a"(S), 146a'"(T), and 146b'(R) 146b"(S), 146bb'" (T), respectively. Photosites 136a' and 136b' are selectively interconnected with storage wells 148a'(R), 148a"(S), 148a'"(I) and 148b'(R), 148b"(S), 146b'"(T), respectively.

Under the control of gating circuit 34, through vertical shift register 154', gating signals are provided to switches 142a'–b', and 144a'–b' which selectively route photoelectrons from the photosites to the appropriate one of the three storage wells (R, S and T) during the correct portion of each cycle of sinusoidally modulated illumination beam 32. That is, during the first 1/3 cycle, for example, of each cycle of sinusoidally modulated illumination beam 32, photoelectrons collected in the photosites are provided to storage well R for each pixel location. During the next 1/3 cycle, gating circuit 34, through vertical shift register 154', provides a signal to each switch to interconnect the photosites with storage wells S so that these storage wells collect photoelectrons during that 1/3 portion of the cycle. And, during the final 1/3 cycle, gating circuit 34 interconnects the photosites with the T storage wells so that they collect photoelectrons during that portion of the cycle. At the end of the 1/30 second image frame time after which each storage well R,S, and T of each pixel has cumulatively collected photoelectrons during a large number of cycles, the photoelectrons from the storage wells are transferred to the corresponding vertical shift register columns 158' and 160' under the control of vertical shift registers 154' and 156'. Vertical shift registers 154' and 156' then shift the photoelectrons to horizontal shift registers 162' and 164' which serially output through amplifier 166', on a pixel by pixel, basis the three intensity signals $I_R$, $I_S$ and $I_T$. These intensity signals $I_R$, $I_S$ and $I_T$ for each pixel are provided to amplifier 76 and lines 79, 80 and 81, FIG. 5. Since these signals are output serially instead of in parallel as in FIG. 5, any appropriate manipulation to provide a parallel input to amplifier 76, and lines 79, 80 and 81 may be used, which will be apparent to those skilled in the art.

Although specific features of this invention are shown in some drawings and not others, this is for convenience only as each feature may be combined with any or all of the other features in accordance with the invention.

Other embodiments win occur to those skilled in the art and are within the following claims:

What is claimed is:

1. A three-dimensional imaging system for imaging an object including a plurality of resolvable elements, comprising:

an amplitude modulated radiation source for transmitting radiation to the object;

at least one photoelectric image detector;

means for synchronously enabling and disabling said at least one image detector during at least multiple portions of a period of said modulated radiation source for detecting radiation reflected from the object;

means, responsive to the reflected radiation sensed by said at least one image detector, for calculating a phase angle between the transmitted radiation and the reflected radiation; and means, responsive to said means for calculating the phase angle, for calculating a range of the plurality of elements of the object with respect to each other.

2. The three-dimensional imaging system of claim 1 in which said radiation source is a sinusoidally amplitude modulated radiation source.

3. The three-dimensional imaging system of claim 1 in which said radiation source includes a laser source for illuminating the object.

4. The three-dimensional imaging system of claim 1 in which said radiation source includes a light emitting diode.

5. The three-dimensional imaging system of claim 1 in which said at least one photoelectric image detector is a CCD imager.

6. The three-dimensional imaging system of claim 1 in which there is one photoelectric image detector and said means for synchronously enabling and disabling includes means for detecting radiation during said multiple portions of each period of said amplitude modulated radiation source.

7. The three-dimensional imaging system of claim 1 in which there are three photoelectric image detectors and said means for synchronously enabling and disabling includes means for enabling a different said detector during each of said multiple portions of each period of said amplitude modulated radiation source.

8. The three-dimensional imaging system of claim 1 in which said at least one detector is enabled every one third period of the amplitude modulated radiation source.

9. The three-dimensional imaging system of claim 1 in which said means for calculating the phase angle includes means for calculating the phase angle between the transmitted radiation and the radiation received by the system reflected from each of the plurality of elements.

10. The three-dimensional imaging system of claim 1 further including means, responsive to said at least one photoelectric image detector, for generating a two-dimensional reflectance image of the object from the detected radiation reflected from the object.

11. The three-dimensional imaging system of claim 1 further including means, responsive to said means for calculating the range, for generating a display of the range of said plurality of elements with respect to each other.

12. The three-dimensional imaging system of claim 10 further including means, responsive to said means for calculating the range, for generating a display of a three-dimensional image of the object including the range of the plurality of elements with respect to each other.

13. The three-dimensional imaging system of claims 1 or 10 further including means, responsive to said means for calculating the phase angle, for calculating the absolute range of the plurality of elements to the imaging system.

14. The three-dimensional imaging system of claim 13 in which said means for calculating the absolute range includes means for calculating a first set of phase angles between the transmitted radiation and the radiation received by the system reflected from each of the plurality of elements with said amplitude modulated radiation source transmitting at a first frequency; means for adjusting the frequency of said amplitude modulated radiation source to a second frequency; means for calculating a second set of phase angles between the transmitted radiation and the radiation received by the system reflected from each of the plurality of elements at said second frequency; and means, responsive to said first and second sets of phase angles and said first and second frequencies, for determining the absolute range of the plurality of elements from the system.

15. The three-dimensional imaging system of claim 13 further including means, responsive to said means for calculating the absolute range, for generating a display of the absolute range of said plurality of elements to the imaging system.

16. The three-dimensional system of claim 13 further including means, responsive to said means for calculating the absolute range and said means for generating a two-dimensional reflectance image, for generating a display of a three-dimensional image of the object including the absolute range of said plurality of resolvable elements to the imaging system.

17. The three-dimensional imaging system of claim 1 further including means for compensating for Doppler effects introduced to the system due to relative motion of the system and the object.

18. The three-dimensional imaging system of claim 17 in which said means for compensating includes means for repeatedly obtaining an average calculated phase angle between the transmitted and reflected radiation over a plurality of successive predetermined time periods.

19. The three-dimensional imaging system of claim 18 further including means for determining whether there has been a change in any two successive calculated average phase angles obtained and means for adjusting the means for synchronously enabling to change the frequency of enablement of said detector to force said calculated average phase angle to be equal over said plurality of successive predetermined time periods to compensate for Doppler effects.

20. A three-dimensional imaging system for imaging an object including a plurality of resolvable elements, comprising:
a sinusoidally amplitude modulated illumination source for illuminating the object to be imaged;
at least one synchronously gated CCD imager;
means for synchronously enabling said at least one CCD imager during at least three portions of a sinusoidal period of said modulated illumination source for detecting illumination reflected from the object;
means for calculating a phase angle between the transmitted illumination and the reflected illumination;
means, responsive to said means for calculating the phase angle, for calculating a range of the plurality of elements of the object with respect to each other; and
means, responsive to said means for calculating the range, for displaying the range of the plurality of elements of the object with respect to each other.

21. A three-dimensional imaging system for imaging an object including a plurality of resolvable elements, comprising:
a sinusoidally amplitude modulated illumination source for illuminating the object to be imaged;
at least one synchronously gated CCD imager;
means for synchronously enabling said at least one CCD imager during at least three portions of a sinusoidal period of said modulated illumination source for detecting illumination reflected from the object;
means, responsive to said at least one CCD imager, for generating a two-dimensional reflectance image of the object from the detected illumination reflected from the object;
means for calculating a phase angle between the transmitted illumination and the reflected illumination;
means, responsive to said means for calculating the phase angle, for calculating a range of the plurality of elements of the object with respect to each other; and
means, responsive to said means for calculating the range and said means for generating a two-dimensional reflectance image, for generating a display of a three-dimensional image of the object including the range of the plurality of elements of the object with respect to each other.

22. A three-dimensional imaging system for imaging an object including a plurality of resolvable elements, comprising:
an amplitude modulated radiation source for transmitting radiation to the object;
at least three photoelectric image detectors;
means for synchronously enabling said detectors during a different portion of a period of said modulated radiation source for detecting radiation reflected from the object;

means for calculating a phase angle between the transmitted radiation and the reflected radiation; and means, responsive to said means for calculating the phase angle, for calculating a range of the plurality of elements of the object with respect to each other.

23. A three-dimensional imaging system for imaging an object including a plurality of resolvable elements, comprising:

an amplitude modulated radiation source for transmitting radiation to the object;

first, second and third photoelectric image detectors;

means for synchronously enabling and disabling each of said first, second and third image detectors during a respective first, second and third portion of a period of said modulated radiation source, for detecting radiation reflected from the object;

means, responsive to the reflected radiation sensed by said first, second and third image detectors, for calculating a phase angle between the transmitted radiation and the reflected radiation; and means, responsive to said means for calculating the phase angle, for calculating a range of the plurality of elements of the object with respect to each other.

24. A three-dimensional imaging system for imaging an object including a plurality of resolvable elements, comprising:

an amplitude modulated radiation source for transmitting radiation to the object;

a photoelectric image detector;

means for synchronously enabling and disabling said image detector during multiple portions of a period of said modulated radiation source for detecting radiation reflected from the object;

means, responsive to the reflected radiation sensed by said image detector, for calculating a phase angle between the transmitted radiation and the reflected radiation; and means, responsive to said means for calculating the phase angle, for calculating a range of the plurality of elements of the object with respect to each other.

25. A three-dimensional imaging system for imaging an object including a plurality of resolvable elements, comprising:

an amplitude modulated radiation source for transmitting radiation to the object;

first, second and third photoelectric image detectors;

a gating circuit, which enables and disables each of said first, second and third image detectors during a respective first, second and third portion of a period of said modulated radiation source, for detecting the intensity levels of radiation reflected from the object at three different times during one period;

a computer, responsive to said intensity levels, for calculating a phase angle between the transmitted radiation and the reflected radiation; and a ranging circuit, responsive to said calculation circuit, for calculating a range of the plurality of elements of the object with respect to each other.

26. A three-dimensional imaging system for imaging an object including a plurality of resolvable elements, comprising:

an amplitude modulated radiation source for transmitting radiation to the object;

a photoelectric image detector;

a gating circuit, which enables and disables said image detector during multiple portions of a period of said modulated radiation source, for detecting the intensity levels of radiation reflected from the object at multiple times during one period;

a computer, responsive to said intensity levels, for calculating a phase angle between the transmitted radiation and the reflected radiation; and a ranging circuit, responsive to said calculation circuit, for calculating a range of the plurality of elements of the object with respect to each other.

* * * * *